United States Patent
Pendergrass et al.

(10) Patent No.: US 8,515,787 B2
(45) Date of Patent: Aug. 20, 2013

(54) SYSTEM AND METHOD FOR PROCESSING AND TRANSMITTING PAYROLL-RELATED DATA FOR INSURANCE TRANSACTIONS

(75) Inventors: Jesse L. Pendergrass, Wichita, KS (US); Brian M. Farrell, West Hartford, CT (US); Donato L. Monaco, Cromwell, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 746 days.

(21) Appl. No.: 12/639,196

(22) Filed: Dec. 16, 2009

(65) Prior Publication Data

US 2010/0094666 A1 Apr. 15, 2010

Related U.S. Application Data

(63) Continuation-in-part of application No. 11/975,224, filed on Oct. 17, 2007, now Pat. No. 8,112,333.

(51) Int. Cl.
*G06Q 40/00* (2006.01)

(52) U.S. Cl.
USPC ........ 705/4; 705/35; 705/39; 705/30; 705/1.1

(58) Field of Classification Search
USPC ............... 705/1.1, 4, 30, 32, 39, 35, 36 R, 705/40, 322; 235/380; 702/179; 715/700, 715/763
See application file for complete search history.

(56) References Cited

U.S. PATENT DOCUMENTS

| | | | |
|---|---|---|---|
| 5,875,435 A | 2/1999 | Brown | |
| 5,909,673 A | 6/1999 | Gregory | |
| 6,181,814 B1 | 1/2001 | Carney | |
| 6,401,079 B1 | 6/2002 | Kahn et al. | |
| 6,411,938 B1 | 6/2002 | Gates et al. | |
| 6,829,588 B1 | 12/2004 | Stoutenburg et al. | |
| 6,938,048 B1 | 8/2005 | Jilk et al. | |
| 7,050,932 B2 | 5/2006 | Selby et al. | |
| 7,110,979 B2 * | 9/2006 | Tree | 705/39 |
| 7,143,051 B1 | 11/2006 | Hanby et al. | |
| 7,194,426 B1 | 3/2007 | Box | |
| 7,213,064 B2 | 5/2007 | Smith et al. | |
| 7,229,013 B2 | 6/2007 | Ben-Aissa | |
| 7,249,073 B1 | 7/2007 | Lesk | |
| 2002/0022982 A1 * | 2/2002 | Cooperstone et al. | 705/7 |
| 2002/0069077 A1 | 6/2002 | Brophy et al. | |

(Continued)

OTHER PUBLICATIONS

Al Wright,—"Tools for Automating Complex Compensation Programs", 2003, Sage Publications.*
Carrier and Payroll Service Bypass Agents Pay-as-you-go system nets 10,000 clients in a year, SBB. Small Business Banker. New York: Oct. 2000. vol. 1, Iss. 9; p. 11.
Pay As You Go by Jacquelyn Lynn, Entrepreneur, Apr. 2001.

(Continued)

*Primary Examiner* — John H Holly
(74) *Attorney, Agent, or Firm* — Howard IP Law Group, PC

(57) ABSTRACT

A computer system accesses payroll-related insurance premium data at an individual employee level and provides the data at the individual employee level, including cost of insurance at the individual employee level, on a client device. A computer system compares stored data with payroll data and identifies employees lacking occupation classification information for payroll-based premium determination. The computer system provides a fillable form on a user device for the user to provide occupation classification data, and receives the occupation classification data. The computer system provides fillable forms on a user device for a user to provide payroll data for receipt by the system, runs business rules on the received payroll data, determines premiums for payroll-based insurance coverage.

19 Claims, 15 Drawing Sheets

(56) References Cited

U.S. PATENT DOCUMENTS

| | | |
|---|---|---|
| 2002/0138306 A1 | 9/2002 | Sabovich |
| 2002/0184148 A1 | 12/2002 | Kahn et al. |
| 2002/0188480 A1 | 12/2002 | Liebeskind et al. |
| 2003/0171956 A1 | 9/2003 | Cox et al. |
| 2003/0182147 A1 | 9/2003 | Mahoney et al. |
| 2003/0187694 A1 | 10/2003 | Rowen |
| 2003/0204421 A1 | 10/2003 | Houle et al. |
| 2003/0225690 A1 | 12/2003 | Eaton |
| 2003/0229522 A1 | 12/2003 | Thompson et al. |
| 2004/0049397 A1 | 3/2004 | Leisure et al. |
| 2004/0049436 A1 | 3/2004 | Brand et al. |
| 2004/0158512 A1 | 8/2004 | Dean et al. |
| 2004/0167853 A1 | 8/2004 | Sharma |
| 2004/0267595 A1 | 12/2004 | Woodings et al. |
| 2005/0228728 A1 | 10/2005 | Stromquist |
| 2006/0020545 A1 | 1/2006 | Lindheimer et al. |
| 2006/0036528 A1 | 2/2006 | Harnsberger |
| 2006/0064313 A1 | 3/2006 | Steinbarth et al. |
| 2006/0100912 A1 | 5/2006 | Kumar et al. |
| 2006/0173775 A1 | 8/2006 | Cullen, III et al. |
| 2006/0212393 A1 | 9/2006 | Lindsay Brown |
| 2006/0224475 A1 | 10/2006 | Kramer et al. |
| 2006/0247953 A1 | 11/2006 | Pollack et al. |
| 2006/0253306 A1* | 11/2006 | Richardson et al. .............. 705/4 |
| 2006/0259437 A1 | 11/2006 | Armstrong et al. |
| 2007/0136156 A1 | 6/2007 | Seeley et al. |
| 2007/0185791 A1 | 8/2007 | Chan et al. |
| 2007/0185793 A1 | 8/2007 | George |
| 2007/0185797 A1 | 8/2007 | Robinson |
| 2007/0203756 A1 | 8/2007 | Sears et al. |
| 2008/0162535 A1 | 7/2008 | Bak |

OTHER PUBLICATIONS

Paychex Teams Up With the Hartford to Help Small Businesses Manage Workers' Compensation Costs, Business Editors. Business Wire. New York:Jun. 15, 1999., p. 1.

The Hartford Partners with Time+Plus to Reach More Small Businesses, PR Newswire. New York:Mar. 30, 2004. p. 1.

"Carrier and Payroll Service Bypass Agents Pay-as-you-go system nets 10,000 clients in a year", SBB. Small Business Banker, New York: Oct. 2000, vol. 1, Issue 9, p. 11.

"Paychex Teams Up With the Hartford to Help Small Businesses Manage Workers' Compensation Costs", Business Editors, Business Wire, New York: Jun. 15, 1999, p. 1.

"Pay As You Go" by Jacquelyn Lynn, Entrepreneur, Apr. 2001.

"The Hartford Partners with Time+Plus to Reach More Small Businesses", PR Newswire, New York: Mar. 30, 2004, p. 1.

The Hartford; Self Administered Billing Premium Statement.

The Hartford; List Bill Premium Statement.

The Hartford; Introducing Your Bill from . . . The Hartford.

The Hartford; List Billing.

The Hartford; Self-Administered Billing.

The Hartford; List Billing—Recordkeeping; Table of Contents.

Barbara Whitaker; "A Less Burdensome Path to Safeguard the Future"; The New York Times (Aug. 3, 1997).

Fort Dearborn Life; "Benefits Manager Overview and Billing Methods" (2007).

Gerald M.Groe, PhD et al; "Research Update: Information Technology and HR"; Human Resources Planning; 91:1 (1996).

Al Wright; "Tools for Automating Complex Compensation Programs", Compensation and Benefits Review; Nov./Dec. 2003.

\* cited by examiner

| THE HARTFORD | | | | | | | | | | | Home  Contact Us | | Logged in as Xxxx Xxxxxxx |
|---|---|---|---|---|---|---|---|---|---|---|---|---|---|
| Business Owners | Payroll Service Provider | | | | My Policy | | | | | | | | Logout |

Select Payroll Check Date  Policy Number: xxxxxxxx xxx
08/20/2009 ▽  Policy Period: 02/04/2009 - 02/04/2010

| State | Class | Type | Employee | Owner/Officer | Payroll Period | Total Wages | Excluded Wages | Subject Wages | Adj. Rate | Earned Premium | Collected Premium | Draw Date | Policy To Date Subject Wages | Policy To Date Premium |
|---|---|---|---|---|---|---|---|---|---|---|---|---|---|---|
| Illinois | 8810 | A | xxxxx xxxxxxxx | | 08/20/2009 | $1,812.50 | $0.00 | $1,812.50 | 0.004 | $7.25 | $7.25 | 08/28/2009 | $25,374.98 | $101.50 |
| Illinois | 8810 | A | xxxxxxxxx xxxxxxxx | | 08/20/2009 | $1,512.00 | $0.00 | $1,512.00 | 0.004 | $6.05 | $6.05 | 08/28/2009 | $23,541.00 | $94.17 |
| Illinois | 8810 | A | xxxxxxxxxxx | | 08/20/2009 | $858.50 | $0.00 | $858.50 | 0.004 | $3.43 | $3.43 | 08/28/2009 | $13,044.67 | $50.24 |
| Illinois | 8810 | | SUBTOTAL | | | $4,183.00 | $0.00 | $4,183.00 | | $16.73 | $16.73 | | $61,960.65 | $245.91 |
| Michigan | 8803 | A | xxxxxxxxx | | 08/20/2009 | $2,554.17 | $0.00 | $2,554.17 | 0.0014 | $3.58 | $3.58 | 08/28/2009 | $35,758.39 | $50.12 |
| Michigan | 8803 | A | xxxxxxxxx | | 08/20/2009 | $4,583.33 | $0.00 | $4,583.33 | 0.0014 | $6.42 | $6.42 | 08/28/2009 | $64,166.63 | $89.88 |
| Michigan | 8803 | A | xxxxxxxxxxx | | 08/20/2009 | $3,281.25 | $0.00 | $3,281.25 | 0.0014 | $4.59 | $4.59 | 08/28/2009 | $45,331.76 | $63.42 |
| Michigan | 8803 | A | xxxxxxxx xxxx | | 08/20/2009 | $2,750.00 | $0.00 | $2,750.00 | 0.0014 | $3.85 | $3.85 | 08/28/2009 | $38,499.98 | $53.90 |
| Michigan | 8803 | A | xxxxxxxxxxx | | 08/20/2009 | $3,895.83 | $0.00 | $3,895.83 | 0.0014 | $5.45 | $5.45 | 08/28/2009 | $54,541.62 | $76.30 |
| Michigan | 8803 | | SUBTOTAL | | | $17,064.58 | $0.00 | $17,064.58 | | $23.89 | $23.89 | | $238,298.38 | $333.62 |
| | | | TOTAL | | | $21,247.58 | $0.00 | $21,247.58 | | $40.62 | $40.62 | | $300,259.03 | $579.53 |

- The "Type" indicates the classification status relative to each employee.
  o "D" (default) classifications represent employees defaulted to the policy's governing classification. This occurs in circumstances whereby the actual Workers' Compensation classification for the employee is unknown.
  o "A" (actual) classifications represent Workers' Compensation classifications assigned as a result of correspondence with / direction from the insured.

https://www.thehartford.com/workerscomp/secure/012345

*Fig. 4*

THE HARTFORD

| Business Owners | Payroll Service Provider | My Policy |

Home | Contact Us

Logged in as Xxxx Xxxxxxx
Logout

Policy Number: xxxxxxxxxx

Select Payroll Check Date
Non-Pay Based Premium ▽

| Description | Amount | Draw Date | Policy Term |
|---|---|---|---|
| EXPENSE CONSTANT | $185.00 | 5/2/2008 | 4/29/2008 - 4/29/2009 |
| Total | $185.00 | | |

- The "Type" indicates the classification status relative to each employee.
  - "D" (default) classifications represent employees defaulted to the policy's governing classification. This occurs in circumstances whereby the actual Workers' Compensation classification for the employee is unknown.
  - "A" (actual) classifications represent Workers' Compensation classifications assigned as a result of correspondence with / direction from the insured.

**Please review each employee's state and Workers' Compensation classification as detailed in this report. If you identify any employees with an incorrect Workers' Compensation classification or state designation, please contact us.
***Premium collection for included corporate officers, LLC members, partners, and sole proprietors is conducted in accordance with state guidelines whereby wage assessments for these individuals are created or pro-rated based on wage caps or minimum / maximum wage ranges as defined by the state.

MAXIMUM CONTROL *over your Workers' Compensation Payments*

Legal | Privacy | Producer Compensation
Product & Agent Licensing Disclosure https://www.thehartford.com/workerscomp/secure/123456

*Fig. 5*

Please complete the following form for all unclassified employees. This will allow us to give you the most accurate premium calculation possible.

State      Class     Officer
                      720        722       724

710  1. John Rambo    [  ▷]     [   ▷]     [ ]
     2. Jane Smith    [  ▷]     [   ▷]     [ ]
     3. Daniel Boone  [  ▷]     [   ▷]     [ ]
     4. Martin Luther [  ▷]     [   ▷]     [ ]
     5. Jill Jones    [  ▷]     [   ▷]     [ ]
     6. Abraham Lincoln  Washington, DC   Office Clerical If you see any mistakes in the employee classifications, or in the classes and states available on your policy, or have any other information you wish to provide to us, please usse the space below.

[                                              ]
                                         [Submit]
730                                         740 https://www.thehartford.com/workerscomp/secure/987

Please complete the following form for Workers' Compensation insurance premium calculation.

| State | Class |
|---|---|
| CT | 8810 - Office Clerical |

Standard Wages:
Bonus:
Tips:
Commission:
Vacation:
Sick Time:
Overtime:

CT  1234 - Some Class

Standard Wages:
Bonus:
Tips:
Commission:
Vacation:
Sick Time:
Overtime:

Submit https://www.thehartford.com/workerscomp/secure/654

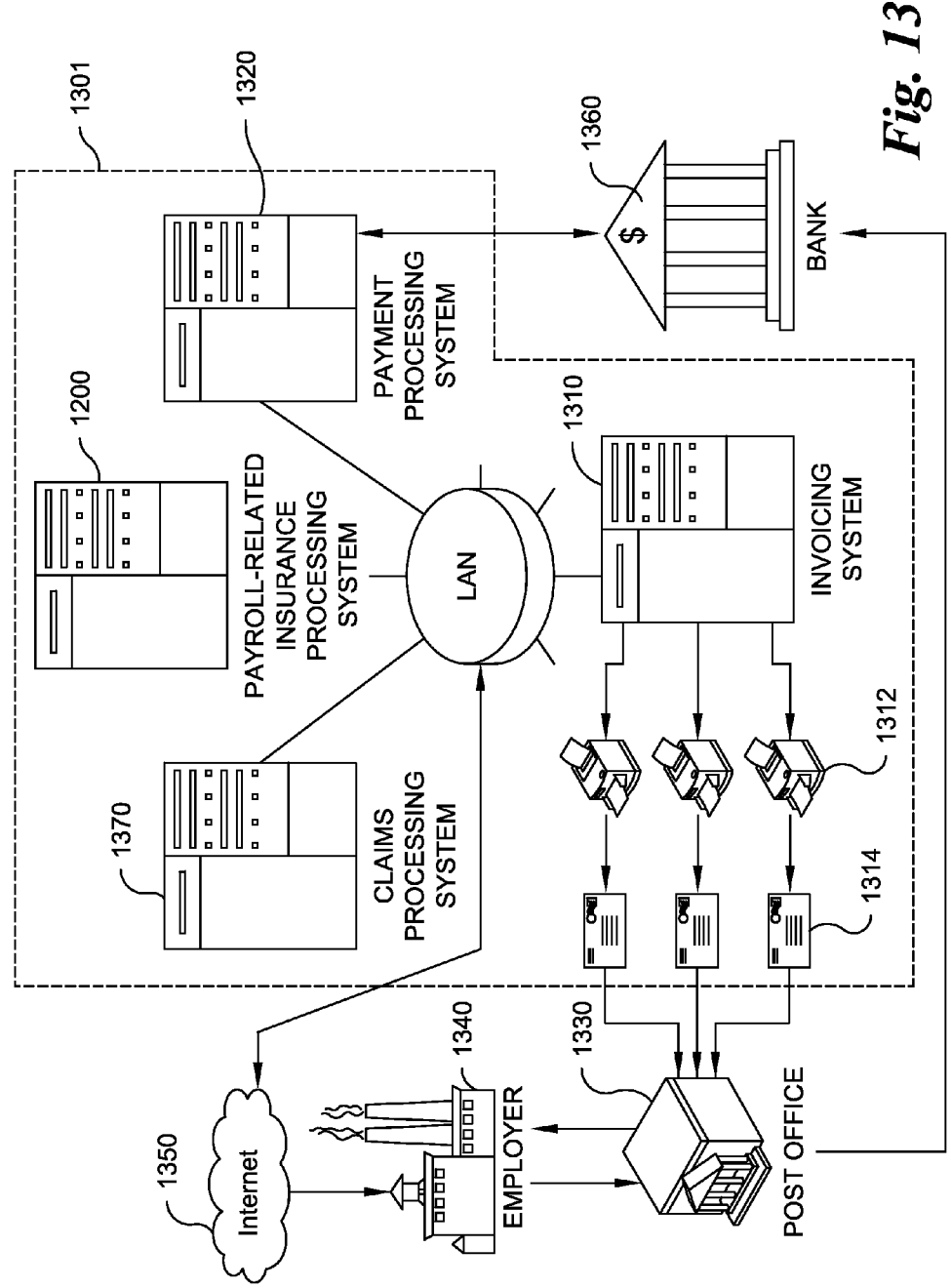

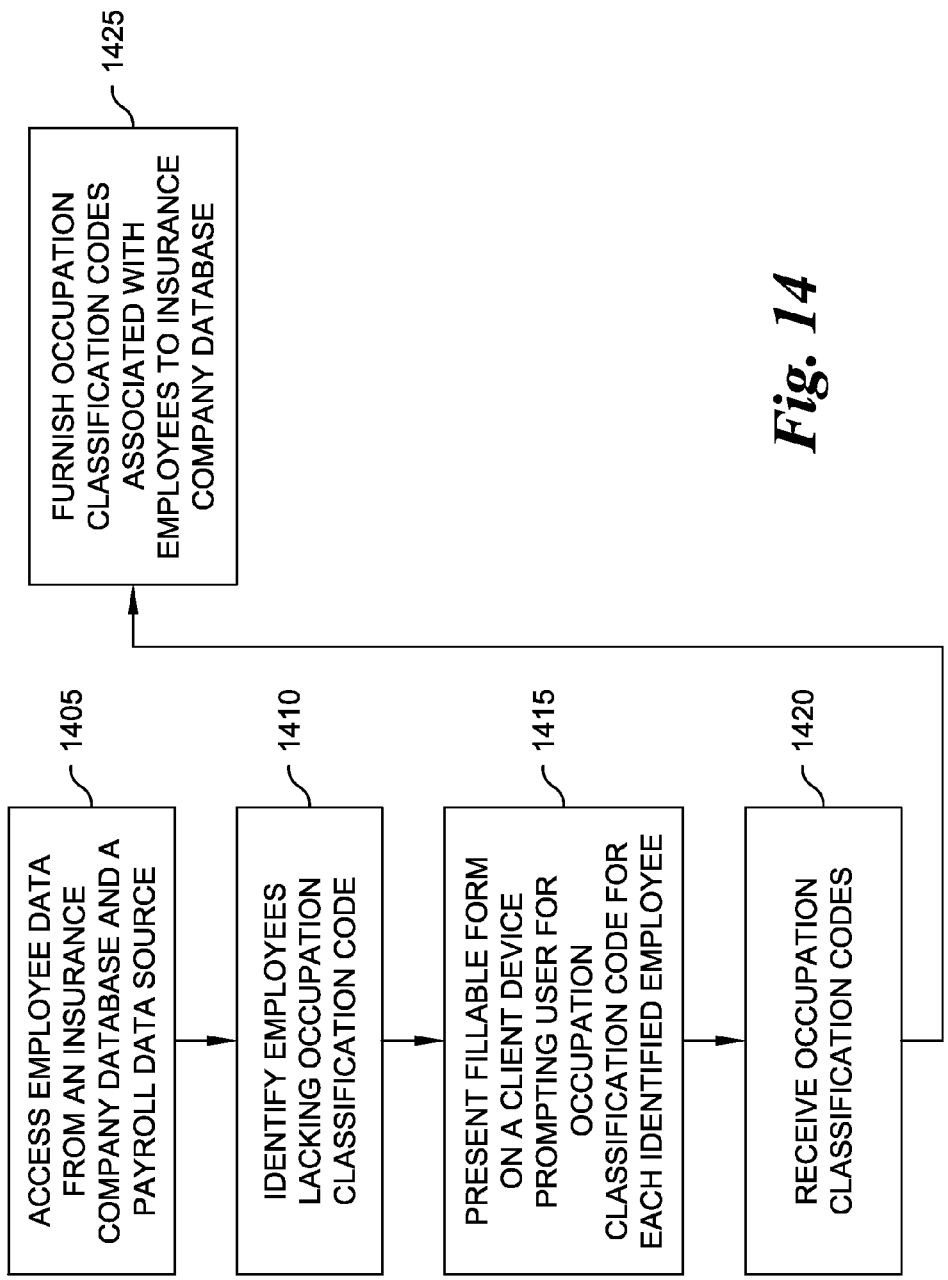

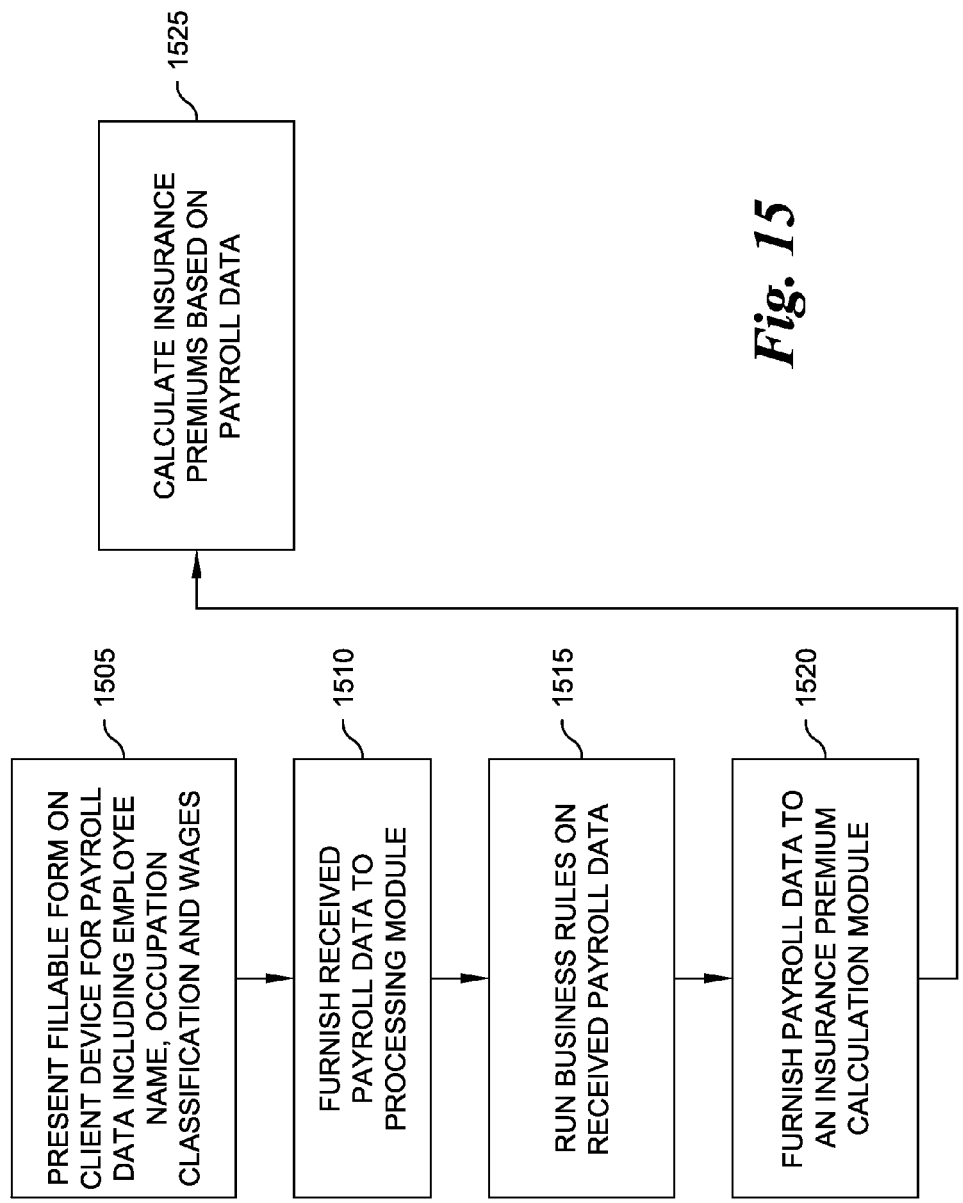

SYSTEM AND METHOD FOR PROCESSING AND TRANSMITTING PAYROLL-RELATED DATA FOR INSURANCE TRANSACTIONS

RELATED APPLICATIONS

This application is a continuation-in-part of copending U.S. patent application Ser. No. 11/975,224, filed Oct. 17, 2007, which application is incorporated herein by reference in its entirety for all purposes.

FIELD OF INVENTION

The present invention relates to computer systems, and particularly to computer systems for processing payroll-related insurance transactions.

BACKGROUND

Employers purchase a variety of insurance products from insurance companies related to employees. Examples of these insurance products include workers compensation insurance, employer-provided term life insurance, and other insurance products. Premiums are calculated by the insurance company based on estimated numbers of employees, employee occupations, salary ranges of employees, locations of employees, and other factors.

The determination of the total premiums is complicated. Reporting to the employer/customer by the insurance company is typically accomplished by a physical printed reported mailed to the employer. The printed report does not provide granular reporting, but provides premium calculations at a higher level for larger employers. For example, premiums for a multi-state employer may be reported by class and state. Additional detail is undesirable from the standpoint of excessive paper and postage cost.

When employees are added to a payroll, the employer does not typically immediately notify the insurance company that provides payroll-based insurance coverage. The insurance company may receive a report of payroll information, including employee data, from a payroll company, and identify employees for whom required information for determination of premium charges is lacking. For example, location of employment and occupation classification data may be lacking. Insurance company personnel typically telephone the employer to obtain this information. The use of personnel to telephone the employer is labor-intensive. Owners and managers needed to complete the information may not be available at the times when insurance company personnel are making calls. For example, owners of construction contractors may be on job sites and not available during normal business hours when insurance company personnel are making calls. Similarly, owners of restaurants may be at the restaurant location primarily in evenings and not available during the daytime.

Small businesses often do not use payroll companies to prepare their payrolls. Such businesses will often employ a bookkeeper to prepare payrolls on a manual basis. As a result, such businesses do not have electronic sources of payroll information that can readily be provided to insurance companies for accurate determination of premiums for payroll-related insurance. The lack of such information may result in inaccuracies in premiums. If the insurance company performs an audit, significant discrepancies that must be remedied by refunds or additional premium payments are often identified.

SUMMARY

In one embodiment, a computer system for administration of payroll-related insurance transactions has: a system access module configured to authenticate a user from a client device; a data access module configured to, responsive to a request from the authenticated user via the client device, accessing from an insurance company database payroll-related insurance data of an employer associated with the authenticated user, said data including cost data at an employee level and occupation codes associated with employee; a processing module configured to identify, based on the accessed employee data, employees lacking an associated occupation classification code; and a presentation module configured to furnish, for display on a client device: insurance cost data at an employee level; an occupation code form listing each of the employees identified as lacking an associated occupation classification code and a user prompt for an occupation classification code, and for receiving classification codes from the user; and a fillable form prompting the user to provide payroll data, the payroll data including employee geographic data, occupation classification and gross amount paid; to receive classification codes and payroll data from the client device, and to furnish received classification codes and payroll data to the processing module. The processing module is further for furnishing received payroll data and classification codes to the insurance company database.

In an embodiment, a computer system for furnishing payroll-related insurance data for insurance products supplied to an employer by an insurance company, to a client device, includes: a system access module configured to authenticate a user from the client device, the user being associated with the employer; a data access module configured to, responsive to a request from the authenticated user via the client device, accessing payroll-based insurance data of the employer from an insurance company database, including individual employee identifiers, occupation codes associated with each individual employee, wages associated with each individual employee, and insurance premiums associated with each individual employee; and a presentation module configured to present the accessed payroll-based insurance data of the employer, including individual employee identifiers, occupation codes associated with each individual employee, wages associated with each individual employee, and insurance premiums associated with each individual employee, on the client device.

In an embodiment, a computer system for classification of employees for use in payroll-based insurance services, includes: a data access module configured to access employee data from a payroll data source and from an insurance company database, the employee data including name, state, and wage amounts; a processing module configured to identify, based on the accessed employee data, employees lacking an associated occupation classification code; and a presentation module configured to present a fillable form on a display on a client device listing each of the identified employees and a user prompt for an occupation classification code, and for receiving classification codes from the user. The processing module is further for furnishing received classification codes to the insurance company database. The system further includes a premium determination engine for calculating premiums based on the received classification codes.

In an embodiment, a computer system for receiving payroll related employee data and determining payroll related insurance premiums, includes: a presentation module configured to provide a fillable form for display on a client device, the form prompting the user to provide payroll data, the payroll data including employee geographic data, occupation classification and gross amount paid, and for providing received data to a processing module; a processing module configured to receive the payroll data from the presentation module, for running business rules on the received payroll data, and for providing the payroll data to a premium calculation module; and a premium calculation module configured to calculate premiums based on the received payroll data.

In an embodiment, a computer-implemented method for furnishing payroll-related insurance data to a user associated with an employer via a client device, includes: authenticating the user by a system authentication module; accessing, by a processor of a data access module responsive to a request from the user device, payroll-based insurance data of the employer from a database, the accessed payroll-based insurance data including names of a plurality of employees and employee data associated with each of the employees, the employee data including wages paid to the employee, occupation classification code of the employee, employment location of the employee, and cost of premium for payroll-based insurance coverage associated with the employee; presenting, by a processor of a presentation module, the accessed payroll based insurance data of the employer on a display of the client device, the presenting including presenting employee names and associated with each of the employee names, employee data including wages paid to the employee, occupation classification code of the employee, employment location of the employee, and cost of premium for payroll-based insurance coverage associated with the employee.

In an embodiment, a computer-implemented method for classification of employees for use in payroll-based insurance services, includes: accessing by a processor of a data access module employee data, of employees associated with an employer, from a payroll data source and from an insurance company database; identifying by a processor of a processing module, based on the accessed employee data, employees lacking an associated occupation classification code; presenting, by a processor of a presentation module, responsive to a request from a user associated with the employer, a fillable form on a display on a client device listing each of the identified employees and a user prompt for an occupation classification code; receiving occupation classification codes from the user; and furnishing by a processor of the processing module received occupation classification codes to the insurance company database.

In an embodiment, a computer-implemented method for receiving payroll related employee data and determining payroll related insurance premiums, includes: providing by a processor of a presentation module a fillable form for display on a client device, the form prompting the user to provide payroll data, the payroll data including employee geographic data, occupation classification and gross amount paid; providing by a processor of the presentation module received data to a processing module; running by a processor of the processing module business rules on the received data; furnishing by the processor of the processing module the data to a premium calculation module; and calculating by a processor of the premium calculation module premiums based on the received payroll data.

BRIEF DESCRIPTION OF THE FIGURES

FIG. 4 is an exemplary screen display showing payroll-related insurance data at an employee level.

FIG. 5 is another exemplary screen display showing payroll-related insurance data.

FIG. 7 is an exemplary screen display in an embodiment of the system of FIG. 6.

FIG. 9 is an exemplary form for use in the system of FIG. 8.

FIG. 13 is a high level schematic view of an environment for implementation of a method and system of the invention.

FIG. 14 is a process flow diagram of steps in a method of an embodiment of the invention.

FIG. 15 is a process flow diagram of steps in a method of an embodiment of the invention.

DETAILED DESCRIPTION

It is to be understood that the figures and descriptions of the present invention have been simplified to illustrate elements that are relevant for a clear understanding of the present invention, while eliminating, for the purpose of clarity, many other elements found in typical computer systems and methods for communicating and processing data related to payroll-based insurance products.

Figure 10:
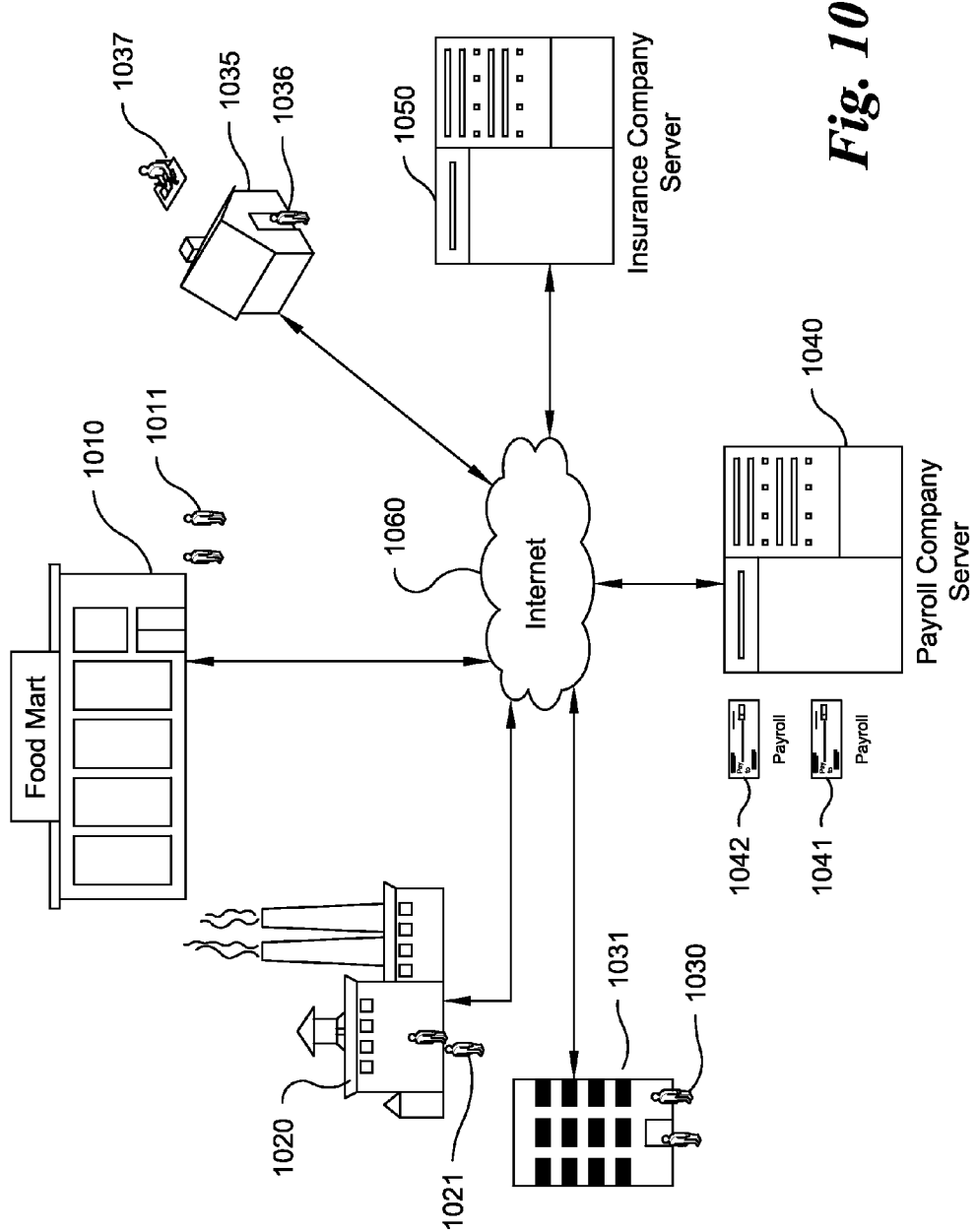
FIG. 10 is a high level schematic view of an environment for implementation of a method and system of the invention.

Referring now to FIG. 10, a high level view of an environment for implementation of a method and system that overcomes the problems encountered in the prior art is illustrated. Businesses of various types that have employees are shown. The exemplary businesses include a retail store 1010 having employees 1011, factory 1020 having employees 1021, office-based business 1030 having employees 1031 and home-based business 1035 having employees 1036. The retail store 1010, factory 1020, office-based business 1030 and home-based business 1035 will each have varying occupation classifications for calculation of workers compensation premiums, for example. The retail store 1010, factory 1020, office-based business 1030 businesses receive their payrolls 1041, 1042, 1433 from a payroll company that has a payroll company sever 1040 for calculating and communicating payroll data, such as via secure communications protocols over Internet 1060, to insurance company server 1050. Home based business 1035 has a manual payroll system implemented on paper records by a bookkeeper 1037 who may perform and check calculations using an electronic calculator.

Insurance company server 1050 permits client devices operated by individual employers and officers and other representatives of to access, via Internet 1060, data on an employee-by-employee level identifying the cost of insurance products. Cost data may be presented for each pay period for each employee. Additional data may be presented for each employee, including location, job classification and pay per payroll, so that the employer may verify the information employed by the insurance company to calculate the insurance costs. For example, since workers compensation insurance premiums vary from state to state, correct identification of the location of an employee is important for accurate calculation of premiums. Since workers compensation insurance premiums also vary depending on the job classification, e.g., premiums are higher for jobs on a factory floor than clerical jobs, correct job classification is also important for accurate calculation of premiums.

Insurance company server 1050 receives payroll data from payroll company server 1040 and compares the received data to payroll data already in the insurance company s records. If new employees have been added, those employees are typically not in the insurance company s records, and the insurance company does not have job classification information for those new employees. The insurance company server may create a fillable form, accessible by the employer over the Internet at a secure website, listing each of the new employees, with a field to permit the employer to input the job classifications of the new employees. The insurance company may then calculate the proper insurance premiums for the new employees.

For a business, such as home-based business 1035, that does not use a payroll service company or its own software to prepare payrolls, the insurance company server may provide a fillable form, accessible on a secure website by the home-based business 1035, for the employer to input information used in calculation of insurance premiums. The information requested by the form may include employee name, pay for the current payroll, job classification, whether any of the pay for the payroll is in a particular type, such as paid vacation or overtime, and other information. The insurance company server may use this information for calculation of premiums for payroll-based insurance. The insurance company server stores this information, and may provide a form at the next payroll to the employer to permit the employer to update the information to reflect departed employees, new hires, job classification changes, pay changes, and the like.

Figure 1:
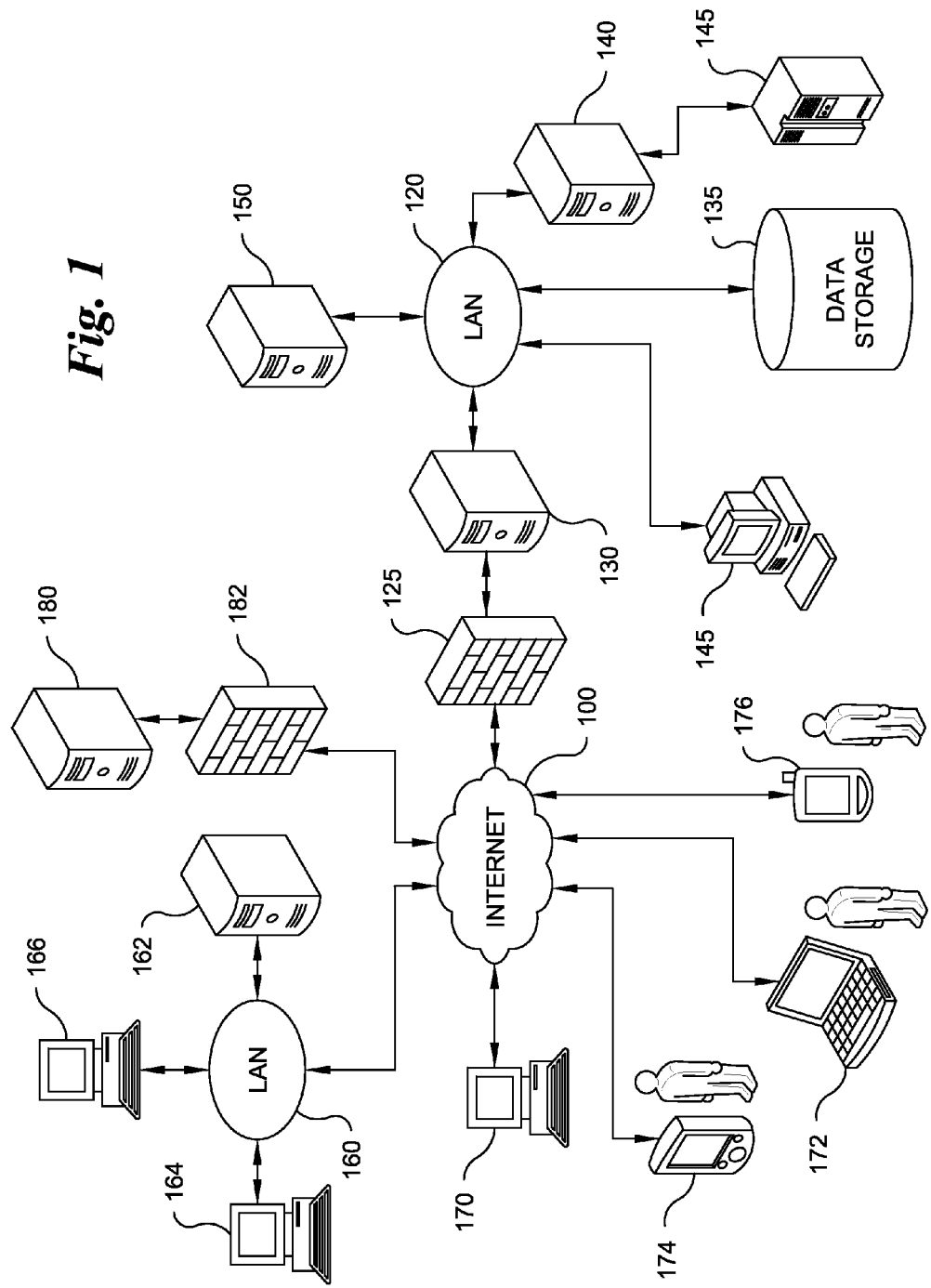
FIG. 1 is a schematic diagram of an exemplary computer network for implementation of a method and system of the invention.

Referring to FIG. 1, an exemplary network configuration is shown. Network 100 connects various computer systems and devices. Network 100 may be or include any type of network, including a local area network (LAN), a wide area network (WAN), an intranet, the Internet, a public switched telephone network (PSTN) or other network. Network 100 may employ any suitable data protocols.

Various devices and networks may be in communication with network 100. In embodiments, client device 170, a desktop computer system, client device 172, a notebook computer system, and client device 174, a personal digital assistant, and client device 176, a smart phone, are in communication with network 100. Client devices 170, 172, 174 are merely exemplary. Local area network (LAN) 160 is an exemplary network of an entity such as a commercial or non-profit entity that has employees and obtains payroll-based insurance products. LAN 160 has in communication therewith desktop computer systems 164, 166, and file server 162. Small business accounting software, such as QuickBooks, may run on file server 162 and be accessible by computer systems 164, 166 in a client-server configuration.

LAN 120 may be a network of an insurance company, by way of example. Firewall unit 125 may be configured to provide data security services with respect to systems and networks, LAN 120 and the devices in communication therewith. Firewall unit 125 may be a stand alone device including one or more processors, data storage devices, and input and output connections. Server 130 may serve as a front-end web server that formats and serves web pages to client devices running browser software. In an embodiment, a processor of server 130 may execute steps of a method of processing payroll-related insurance data. In an embodiment, server 130 may function as a web front-end for another device or system, such as server 150, which may execute steps of a method of extracting payroll-related insurance cost data from a backend database. Server 130 may provide the functionality of one or more of the presentation modules discussed in greater detail herein. Server 150 may provide the functionality of one or more of the processing modules, data access modules and communication modules discussed in greater detail herein. The term module, as used herein, includes computer hardware, including processors and memory devices, having loaded program code causing the processor and other devices to perform particular functions. Server 140 may receive payroll data and perform processing to determine premium amounts for payroll-based insurance products. Server 140 may access data via mainframe 145 for use in calculations of premium amounts.

In embodiments, a network or data processing network, such as Internet 100, may be employed which may include a plurality of individual networks, such as a wireless network and a landline based network, each of which may include a plurality of servers, individual workstations or personal computers. Additionally, as those skilled in the art will appreciate, one or more LANs may be included where a LAN may comprise a plurality of intelligent workstations coupled to a host processor. The networks may also include mainframe computers or servers, such as a gateway computer or application server. A gateway computer serves as a point of entry into each network. The gateway may be preferably coupled to another network by means of one or more communications links. The gateway may also be directly coupled to one or more workstations using a communications link. The gateway computer may also be coupled to a storage device for storing information related to translation of data, such as user identifications, user-specific mapping between different data formats, requirements for data submission for one or more types of insurance transactions, as well as other data. Further, the gateway may be directly or indirectly coupled to one or more workstations. Those skilled in the art will appreciate that the gateway computer may be located geographically remote from the network, and similarly, the workstations may be located geographically remote from the networks and/or network servers. The client devices or workstations may connect to the wireless network using a networking protocol such as the Transmission Control Protocol/Internet Protocol ("TCP/IP") over a number of alternative connection media, such as cellular phone, radio frequency networks, satellite networks, etc. The wireless network may connect to the gateway using a network connection a such as TCP (Transmission Control Protocol) or UDP (User Datagram Protocol) over IP, X.25, Frame Relay, ISDN (Integrated Services Digital Network), PSTN (Public Switched Telephone Network), etc.

Figure 2:
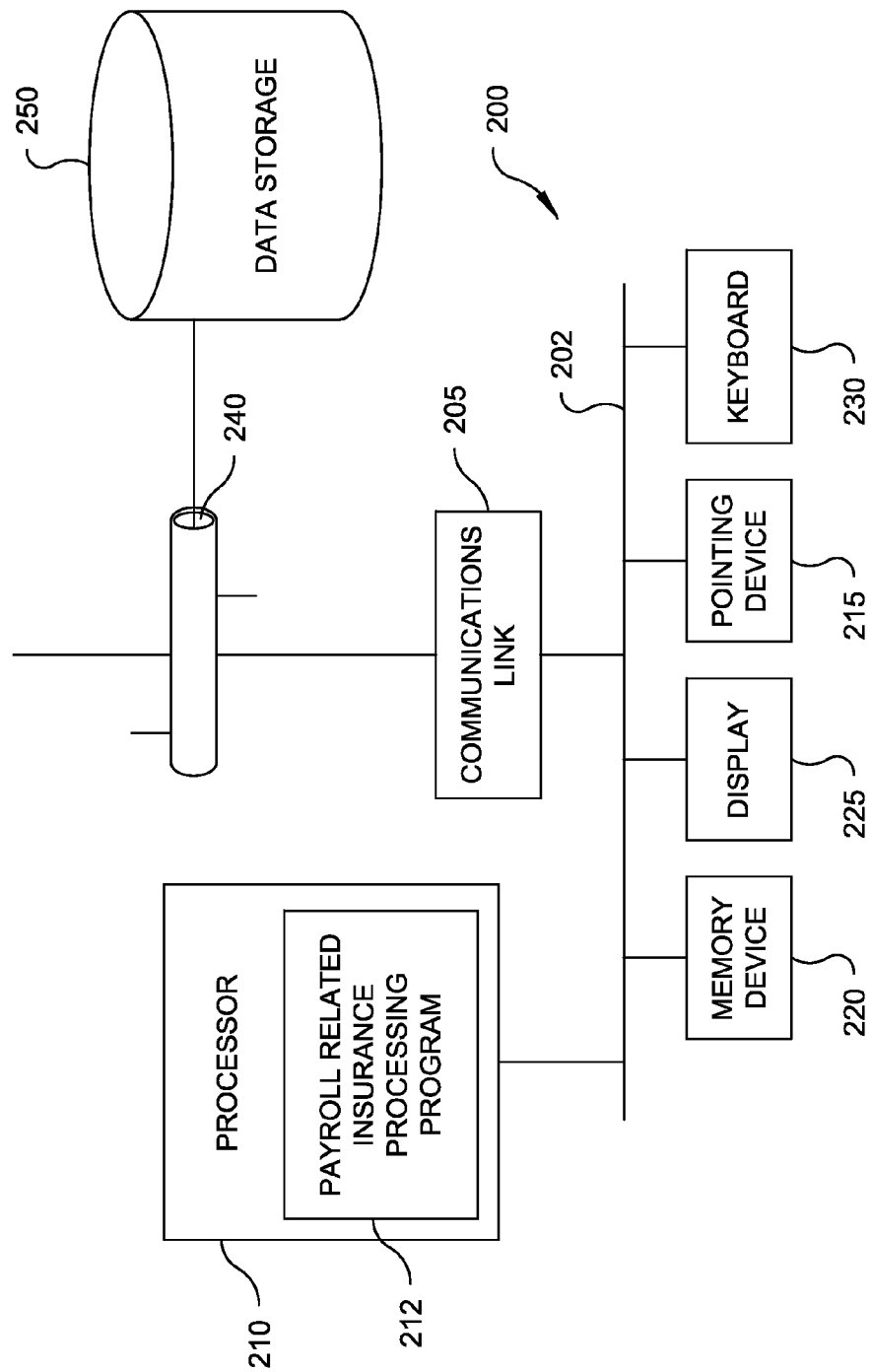
FIG. 2 is a schematic diagram of an exemplary computer system for use in the embodiments of FIG. 1.

Referring now to FIG. 2, a schematic diagram illustrates an exemplary computer system for use in the embodiment of FIG. 1. In computer system 200, processor 210 executes instructions contained in programs such as payroll related insurance processing program 212. Programs may be stored on suitable media, such as optical or magnetic disks, fixed disks with magnetic storage (hard drives), tapes accessed by tape drives, and other storage media. Processor 210 communicates, such as through bus 202 and/or other data channels, with communications link 205 and memory device 220, receives data from user inputs such as pointing device 215 and keyboard 230, and provides data to outputs such as display 225. Memory device 220 is configured to exchange data with processor 210, and may store programs containing processor-executable instructions, and values of variables for use by such programs. User input may be provided at pointing device 215 and keyboard 230, as well as other optional inputs, such as touch screens. In an embodiment, inputs may be received via other user interfaces and workstations connected via wired or wireless communications and via networked communications, such as via LAN 240, to processor 210. Other output devices may be in communication with processor 210, including local and networked printers and speakers. By way of non-limiting example, one or more programs may include instructions causing processor 210 to provide output signals prompting a user to provide payroll data, such as employee names, locations, occupation classifications and compensation. Human operators may provide inputs in response to such prompts, and the inputs may be received by processor 210; processor 210 may cause data contained in such responses to be stored in a suitable format, such as in one or more database programs, in memory device 220, or in networked storage devices, such as data storage 250. Communications link 205 may communicate with remote sources of information, and with systems for implementing instructions output by processor 210, via LAN 240. LAN 240 is merely exemplary, and communication may be by one or more of suitable communication methods, including over wired or wireless local area networks and wide area networks, and over communications between networks, including over the Internet. Any suitable data and communication protocols may be employed.

Figure 3:
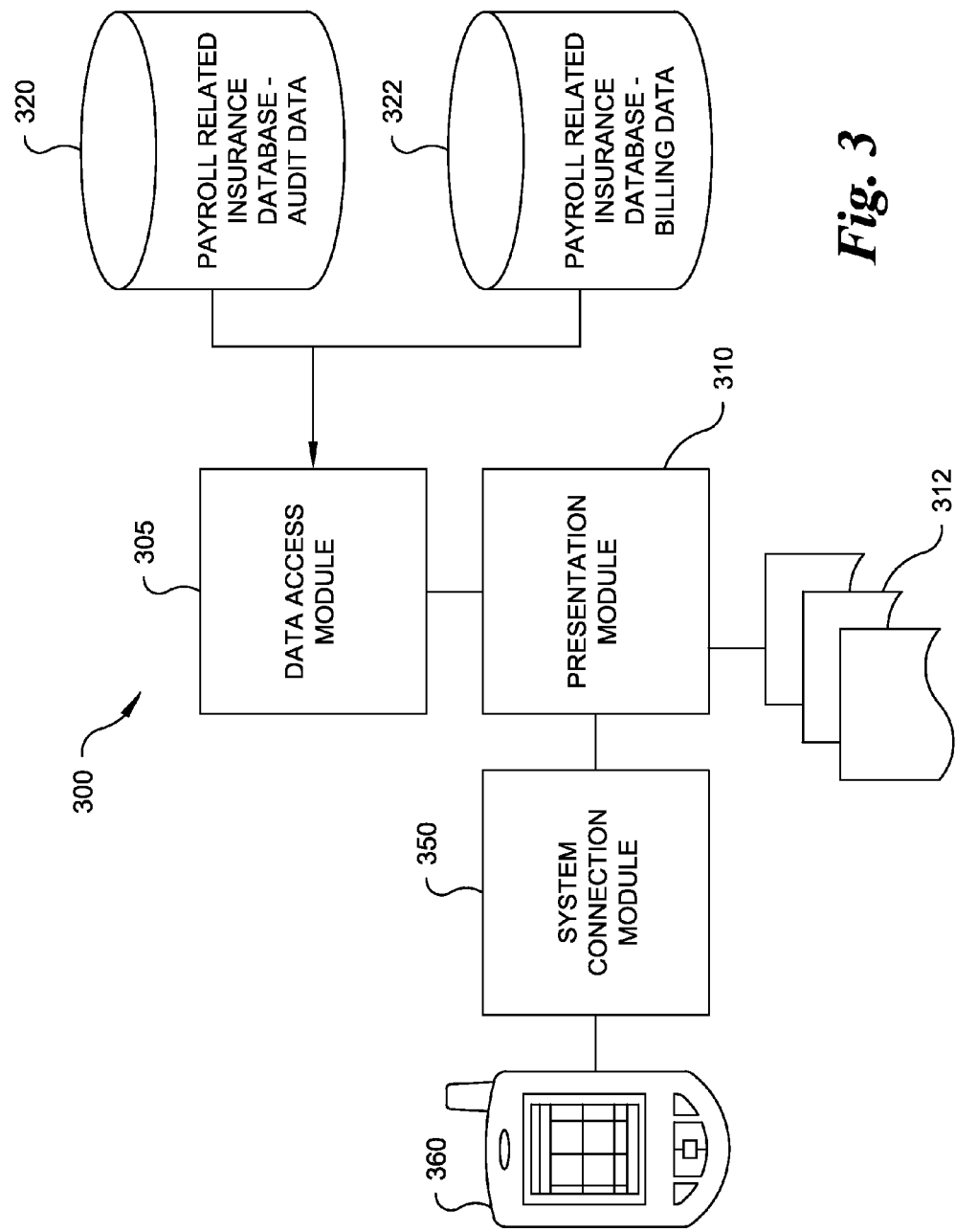
FIG. 3 is a block diagram showing modules in an exemplary system according to an embodiment.

Referring now to FIG. 3, a system 300 for furnishing payroll-related insurance premium data to a client device 360 is shown. System 300 may operate to provide data to any suitable client device, including without limitation the exemplary client devices illustrated in FIG. 1. System 300 includes a data access module 305. A user employing client device 360 may be granted access to system 300 by system connection module 350, which may verify credentials such as user identification and password. Data access module 305 is configured to, responsive to a request from a user device, access payroll-based insurance data of an employer from a database, such as databases 320, 322. The user may be associated with one employer; the association may be maintained in the database, or in separate storage at the server, for example. In an embodiment, a user, such as a broker or other representative, may be associated with more than one employer. The system may provide the user with a drop down menu or other display options to permit furnishing a selection of one employer to the system.

Data access module 305 is configured to access data from insurance company databases including names or other identifiers of employees associated with the employer, and payroll-related insurance data associated with each of the employees. In the embodiment, the insurance company databases include separate audit database 320 and billing database 322. In other embodiments, the audit data and billing data may be in a single database. In other embodiments, the audit data and billing data may be distributed in two or more databases on bases other than a division between audit data and billing data. In an embodiment, the databases may be implemented in any suitable relational database management system, such as Oracle or Microsoft SQL server. The databases include data for each employer, including employees associated with each employer. The data associated with each employee may include the incremental premium cost for that employee. The databases may further include the incremental premium costs associated with each employee for each payroll period, for a policy period, for a period of time other than a policy period or payroll period, or a particular cycle of payroll periods. The databases may include further data for each employee, including employee geographic data, such as a state or other jurisdiction where the employee is employed, an occupational classification code associated with the employee, the total wages paid to that employee for one or more payroll periods, status of the employee as an officer, owner or other proprietor, and types of coverage for each employee. In addition to total wages paid to the employee for one or more payroll periods, the data may include wages paid as tips, wages paid as paid sick leave, paid vacation, paid short-term disability leave, or other paid leave. In an embodiment, suitable SQL queries may be stored in software code in one or more memory devices by data access module 305 and accessed by data access module 305 in response to a user request for data. In another embodiment, queries may be stored in databases 320, 322, and may be accessed by data access module 305.

Data accessed by data access module 305 may be furnished to presentation module 310. Presentation module 310 may have associated therewith one or more templates 312 for presentation of data accessed by data access module 305. The presentation module 310 may populate a selected template with the accessed data and transmit the populated template for display on a client device. System connection module 350 provides authentication and data security services.

Referring to FIG. 4, an exemplary populated template 400 as displayed on a client device 402 is shown. The user has input a selected payroll check date 410 from a drop down menu; the drop down menu is populated based on check data stored in the database and associated with an employer. The policy period 412 and the policy number 414 are also accessed from the database. The display lists each employee associated with the employer, or a subset selected using more selective database queries, by name 426. In this embodiment, each employee has associated with the employee name, geographic data, namely a state 420 of the facility where the employee is employed, an occupation classification code 422, a type 424, whether the employee is an owner, officer or partner of the employer 428. Type 424 provides a code associated with the occupation classification code to indicate whether the occupation classification code is an actual code based on data received from or verified by the employer, or a default code assigned by the insurance company. The default code may be assigned by the insurance company if the employer does not provide an occupation classification code, or if an occupation classification code furnished by the employer is not permitted under the policy. The display further shows payroll period information, including the payroll period ending date 430, the employee s total wages 432 for that period, the employee s excluded wages 434 for that period, and the employees subject wages 436, which is the total wages less the excluded wages. Excluded wages may include, for example, paid vacation wages not subject to workers compensation premiums under applicable state rules, and tips not subject to workers compensation premiums under applicable state rules. The determination of whether wages are excluded may be made using business rules that vary on a state-by-state basis. The business rules reflect state legal and regulatory provisions. For example, the business rules may provide that for a given state, wages paid as sick time are not excluded, but for a different state, wages paid as sick time are excluded. Similar rules may apply for wages paid as vacation time, as tips, and in other categories. The application of business rules requires accurate state data in column 420. The display further shows a premium rate 438, an earned premium amount 440 for that payroll period, a collected premium 442, and the date the collected premium was drawn from the employers bank account 444. The premium rate 438 may be determined in accordance with business rules, and may be dependent on state, occupation classification code, officer or owner status, and other factors. The display further shows a sum of the subject wages for the employee from the commencement of the policy to date 446, and a premium paid 448 on the employee to date under the policy. As the policy commencement date may not be the same as the commencement date of a pay period, the system may calculate the subject wages by pro-rating the wages during a first pay period of the policy period. The policy to date premium 448 is taken from the database. Notes area 450 provides additional information regarding certain items. In the display, notes area 450 provides a detailed explanation of the meanings of the codes D and A in the Type column. Notes area 450 may provide detailed information regarding other categories of data.

In the embodiment shown, the employees are shown individually and grouped by state and occupation classification code, with totals of wage and premium data for each state and occupation class combination. In other embodiments, employees may be grouped by state only, by occupation classification code only, or by other criteria.

In an embodiment, a button permits a user to launch a tool that extracts the displayed data and formats the data in a suitable file for download. The tool may be implemented as software stored in a system memory device. The format of the file may be a spreadsheet format, such as the .xls or .xlsx formats.

In reviewing the data, the user may readily identify data such as incorrect states, occupation classification codes, and wages, and alert the insurance company to provide changes. In an embodiment, the presentation module may be configured to furnish a display that receives user modifications to the displayed data input at the client device. The presentation module may be configured to provide drop down menus with permitted selections based on business rules and based on states, occupation classification codes and other factors permitted under the policy. The presentation module may furnish the modified data to the data access module to update the insurance company databases with corrected data in real time. In an embodiment, the system may be configured to execute business rules by a user a tool may be provided for a user to input updated data in the display, and the browser or other client software furnishes the updated data to the web server, which then transmits the updated data to the database to implement the correction in real time.

Referring to FIG. 5, a screen 500 is displayed on device 502 that is generated in response to selection of the non-payroll based premium option from the select payroll check date drop down of FIG. 4. Here, the expenses that are not based on payroll data are shown. In this embodiment, there is a single entry, expense constant 505, which may be a single expense for a policy term, or may represent an installment payment on a flat expense for a policy term. The installments may be due on a different basis than a payroll schedule. For example, the expense constant 505 may be payable each calendar month. The entries may include payments agreed in a payment plan, such as a payment plan agreed between the employer and the insurance company for payment of underpaid premiums. The entries may reflect flat payments to reflect underpayments identified as a result of an audit by the insurance company of the employers records. For example, an audit may identify individuals classified as independent contractors by the employer, on whom no premiums were paid, while applicable law may require payment of workers compensation insurance premiums. In an embodiment, the constant expense data shown in FIG. 5 may be shown on a same screen with the payroll data of FIG. 4.

Returning to FIG. 3, in an embodiment, system connection module 350 performs functions of authenticating users for access to a computer system for administration of payroll-related insurance policies and transactions, including to access data from the databases 320, 322. System connection module 350 also performs other firewall functions, such as identification and neutralizing of malicious code and other attacks. Presentation module 310 serves to present the accessed payroll based insurance data of the employer on the client device. In an embodiment, a system connection module may be implemented on the server and perform functions of authenticating users and permitting connection to system components. In an embodiment, a system connection module may be implemented on a standalone device including one or more processors and memory devices storing code having instructions which, when executed by the one or more processors, causes the one or more processors to perform authentication and firewall functions.

Figure 6:
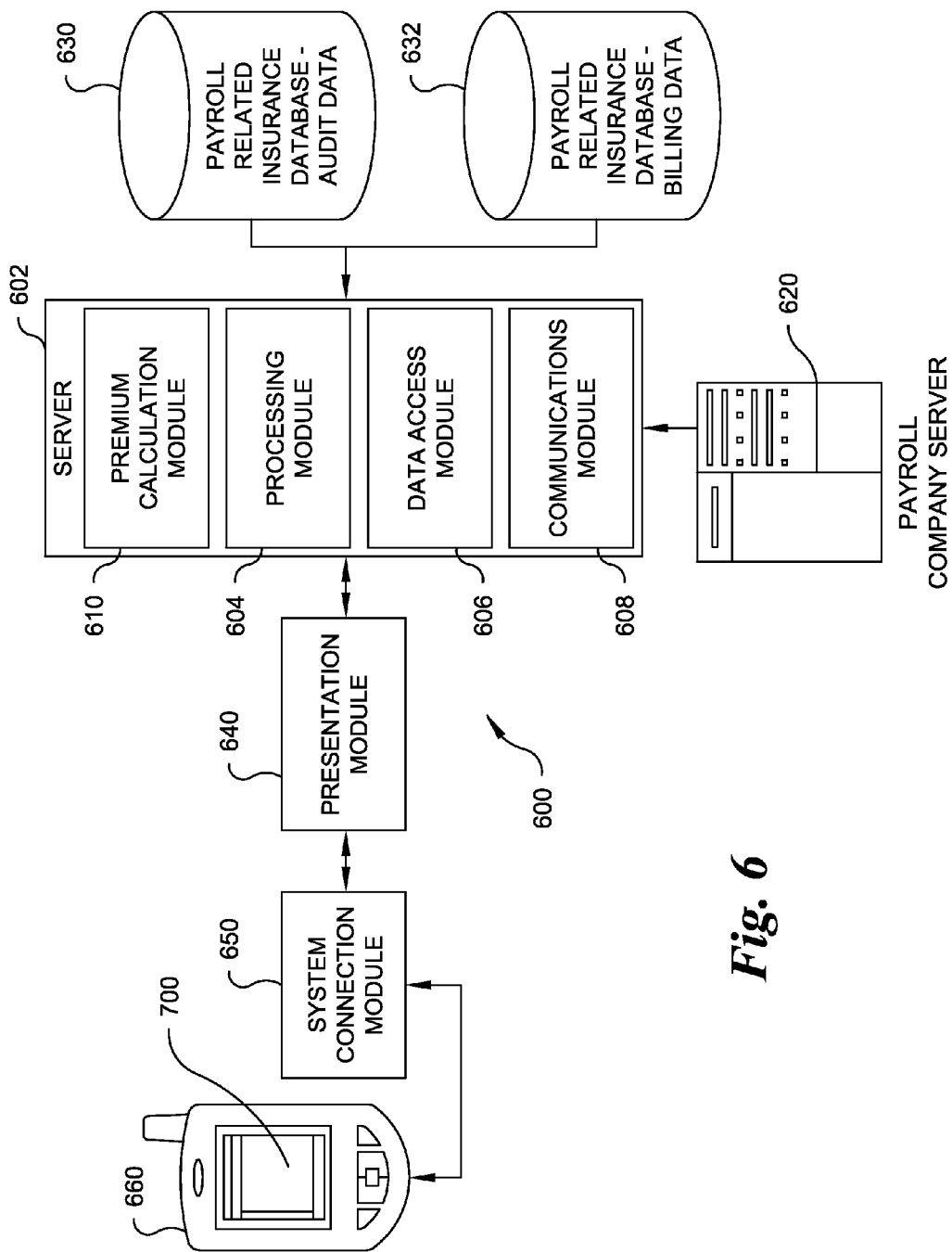
FIG. 6 is a block diagram illustrating an exemplary system for obtaining employee classification data.

Referring now to FIG. 6, an embodiment of a computer system 600 for classification of employees for use in payroll-based insurance services will be explained. Server 602 has a processing module 604, a data access module 606 and a communications module 608. Data access module 606 accesses employee data from a payroll data source, such as payroll company server 620, and from insurance company databases 630, 632. Insurance company databases 630, 632 are merely exemplary, and server 602 may access data in one database, or in two or more databases. Each logical database may be stored on one or more memory storage devices. Data may be accessed via a database server that accesses multiple data storage units in which data in a logical database is stored. A user associated with one or more employers may access server 602 from client device 660, which in this example is a smart phone. System connection module 650 may authenticate the user and provide data security services for communications with client device 660. The user is associated with an employer. Processing module 604 identifies, for one or more employers, based on comparing employee data from the payroll company server 620 and from the insurance company databases 630, 632, employees lacking an associated occupation classification code. Processing module 604 may perform this identification process for a given employer on a periodic basis, when data associated with each payroll of the employer is available from payroll company server 620, or at each authentication of a user associated with the employer, for example. Processing module 604 makes the employee data available to presentation module 640. Presentation module 640 generates and presents on a display on a client device 660, for the authenticated user, a fillable form 700 listing each of the identified employees and a user prompt for an occupation classification code. The presentation module 640 receives classification codes input by the user into client device 660. Processing module 604 further furnishes the received classification codes to the databases 630, 632. The user is thus able to update and correct classification data.

Various rules may be associated with the updating of classification data. For example, a rule may provide a default classification code that is applied to an employee, either upon receipt, or after a period of time has elapsed with no input by the employer. The default code may be a code having a highest premium. For example, for a workers compensation policy, the default code may be a code of a classification subject to a highest risk of injury and highest workers compensation premium rates. In another embodiment, a default code may be a code associated with a highest percentage of employees at that employer or at a class of employer.

After receipt of classification data, rules may be implemented by the processing module for verification. Rules may be provided that create flags if percentages of particular occupation classifications at particular types of employers exceed or are less than set ranges. For example, if the employer is an auto body shop, a flag may be triggered if the percentage of clerical employees exceeds a relatively low percentage, such as 10 percent. If the employer is a building contractor, a flag may be triggered if the percentage of carpenters is below a threshold. If a flag is triggered, a message may be generated by presentation module for display on the client device indicating an error. The insurance company database may include data indicative of permitted occupation classification codes for employees associated with the employer, such as under policy terms. Rules may generate a flag if an occupation classification code is received that is not permitted for the employer s policy. A message may be output to a workstation of insurance company personnel to require manual review and approval of the classifications prior to updating of the databases.

Upon receipt of the occupation classification code data, the data may be provided to premium calculation module for calculation of insurance premiums associated with the employee, based on the occupation classification code and other data, such as state of employment. Processing module 604 may similarly identify employees lacking geographic information based on a comparison of data received from payroll company server 620 and data in insurance company databases 630, 632. Processing module 604 may provide this data to presentation module 640 to include in a fillable form presented to the user on client device 660. The user, thus prompted by the system, may provide geographic location data, such as state of employment for each employee. This data may be checked by processing module 604 for compliance with permitted states under the policy, based on data in the insurance company databases. The state data may be furnished to premium calculation module 610 for use in calculating premiums. Similarly, data indicative of an employee s status as an officer or owner may similarly be included in a fillable form, received by the system, and employed to calculate premiums.

While FIG. 6 illustrates a payroll company server 620 as a source of payroll data, other sources, such as a file on the employer s computer system, may be employed to obtain the employee payroll data.

Referring to FIG. 7, an exemplary fillable form 700 as displayed on a client device 702 is shown. Each identified employee not having an associated occupation classification is listed by name at 710. Associated with each identified employee name are input fields for location, such as state field 720, occupation classification field 722, and an officer yes/no checkbox 724. Under requirements that vary from state to state, various states, officers and proprietors are subject to rules for determination of workers compensation premiums different from those applicable to employees. The state rules vary in some states depending on a category of ownership. Maximum and minimum premiums or maximum and minimum attributed wages are required under applicable rules of certain states. Some state rules permit an employer to select whether an officer or owner is covered. In an embodiment, separate checkboxes may be provided for user selection of officer status or of owner/proprietor status. In an embodiment, upon submission of a form including a user selection of officer or owner/proprietor status, a system may run business rules to determine if, under applicable state requirements, more data is required, or options are available. If more data is required, or options are available, a further screen may be generated and presented to the user with a selection of permitted ownership categories, such as sole proprietor, one of individual joint owners, general partner, limited partner, sole shareholder, majority shareholder, or other options. The data for such a screen may be provided, referring again to FIG. 6, by processing module 604 to presentation module 640, which may select one of a plurality of suitable templates for such a screen. If options are available, the screen may permit the user to make selections, such as opting in or opting out of workers compensation coverage for the particular individual.

Referring again to FIG. 7, each field in form 700 may have a drop down menu, based on data contained in the database for permitted states and occupation classifications under the policy. The drop down menu may permit selection only of permitted states and permitted occupation classifications. A comment field 730 is available for the user to provide comments in free text form. For example, if the drop down menus for location or occupation classifications omit required options, the user may provide comments in field 730. Comments may be directed by the system to an insurance company user. A submit button 740 is provided for the user to provide an instruction for the data to be transmitted by the browser client or client application to an insurance company server for further processing.

Figure 8:
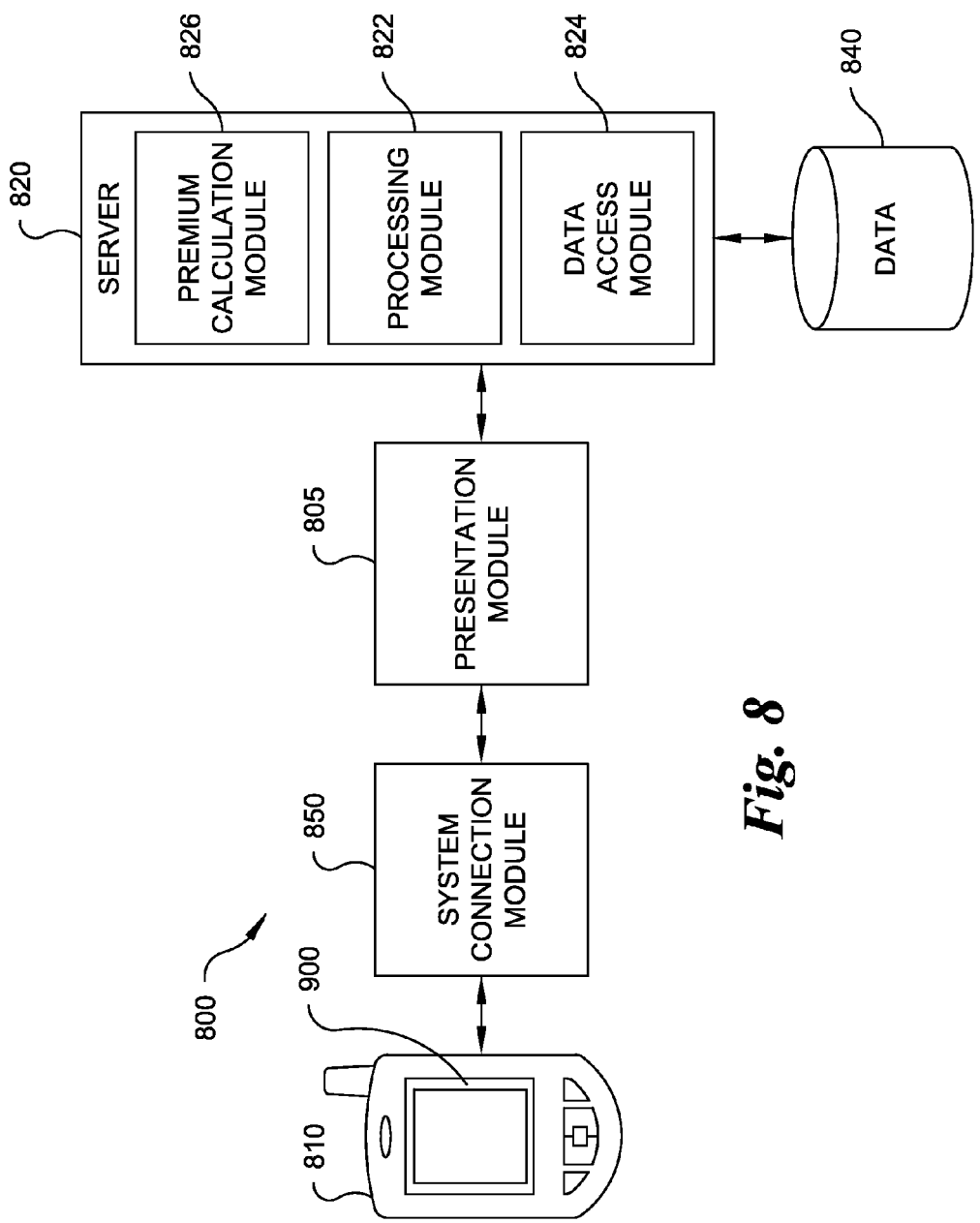
FIG. 8 is a block diagram illustrating a system for obtaining payroll information from an employer.

Referring now to FIG. 8, a block diagram is provided of exemplary system 800 for receiving payroll data for determination of premiums for payroll related insurance. Presentation module 805 provides a fillable form, such as fillable form 900, for display on a client device, such as smart phone 810. System connection module 850 provides user authentication and data security services for data exchanged with smart phone 810. The form prompts the user to provide payroll data, the payroll data including employee geographic data (such as state of employment), occupation classification codes and gross amount paid, and for providing received data to processing module. Other categories of wages, such as bonuses, paid vacation, paid sick leave, commissions, overtime, other paid leave and tips, may be included in fields in the form. Presentation module 805 may pre-fill the form with data from a prior payroll period accessed from an insurance company database. Processing module 822 of server 820 receives user-supplied data from the presentation module 805. Processing module 822 runs business rules on the received data. The business rules may include determining whether the furnished locations and occupation classification codes are permitted for the policy of the employer. The business rules may include rules to determine if percentages of employees in various occupation classes are within permitted ranges for an employer type. The business rules may include rules to determine if the wages are within permitted ranges for occupation classification code and geographic location, by way of further example. If processing module identifies a discrepancy based on the business rules, the processing module may provide a signal to the presentation module to display a suitable error message identifying the data causing the error and the violation. For example, the message may read: Number of clerical employees exceeds maximum for business type with your total payroll. The user may then provide corrected data, which is again subject to business rules by the processing module.

The processing module may provide the data to a premium calculation module 826 for calculating premiums based on the received payroll data and other data stored in datastore 840 and accessed employing data access module 824, which may employ a library of stored queries. Functions of premium calculation module 826 includes applying jurisdictional conditions such as workers compensation classification rates to account for various employee status (e.g., a company officer status may have particularities regarding insurance premium requirements) and applying state rules applicable to such status. State exclusion and inclusion rules may be applied. State exclusion and inclusion rules deal with whether to factor into the workers compensation premium such items as:

Wages, Salaries, Commissions, Bonuses, Overtime (Premium Portion), Shift Differential, Premium Pay, Holiday, Sick, Vacation, Statutory Insurance, Pension, Piecework, Profit Sharing, Incentive Plan, Tool Allowance, Housing Pay, Meal Allowance (regular time), Meal Allowance (overtime), Gift Equivalents, Section 125 (employee paid), Davis-Bacon wages to employee, Annuity plans, Expense reimbursements, Non business expenses, Expense reimbursements, Qualified business expense, Tips, Severance, Military Pay, Employee discounts, Uniform reimbursement, Sick Pay paid by TPA, Davis-Bacon wages to third-party trust, Employer contributions (group insurance/group pension), Employer contributions (salary reduction), Employer contributions (employee savings plans), Employer contributions (retirement), Employer contributions (cafeteria plans), Employer contributions (stock purchase plans), Employer contributions (deferred compensation), Fringe Benefits and Travel Time. Such conditions and rules may be stored in datastore 840, for example.

Referring to FIG. 9, fillable form 900 presented on device 902 is shown. A series of input fields 910 are provided for the user to provide, by state and class, total figures for a given payroll. The totals include standard wages, bonus, tips, commission payments, paid vacation payments, sick time payments, and overtime payments. In an embodiment, each field may be presented for each individual employee; the user may have the option of selecting between total or individual employee inputs.

The present systems may be associated with a system as further described in copending application Ser. No. 11/975, 224, filed Oct. 17, 2007. Such a system may, by way of example, be for accumulating, processing, administering and analyzing workers compensation premiums in an automated workflow environment. The system provides for calculating the workers compensation premiums or a designated period based on the payroll processes, notifying the insured of the amount of funds and timing of each expected withdrawal from its bank account, withdrawing from the insured s bank account the premium funds and transferring the funds to the insurance carrier. This advantageously results in reduced financial risks, reduced non payments of premiums and improvement of cash flows for the insured. The system additionally provides for electronic data transfer pertaining to administrative data, and billing relating to workers compensation premiums. Such a system may notify the user of each expected withdrawal from a bank account, access of which is provided by the user. The system automatically draws the workers' compensation premium from the user's account based on its actual payroll data for the applicable period.

Such a system processes payroll insurance premiums, more particularly, where input data related to workers compensation payment obligations obtained from payroll records is acquired in real-time by validating username/passwords before accessing a customer payroll system payroll database; accessing the customer payroll system payroll database; encrypting payroll data; transmitting encrypted payroll data from the remote site to the central site asynchronously or scheduled in real time; uploading the payroll data onto the central site server database; collecting an employee roster associated with the payroll data; categorizing pay-type information; parsing and translating the categorized information; storing the parsed and translated information into temporary databases; detecting the presence or absence of fraud that may be related to the payroll data; transferring the payroll data resident in the temporary databases to a process for (a) applying state jurisdictional inclusion and exclusion rules applicable to workers compensation payments; and (b) pushing final data into a billing system for debiting the customer account.

Such a system may include a remote site payroll system configured with a accounting/bookkeeping software such as QuickBooks® Pro/Premier/Enterprise residing in a memory, a customer payroll system having a payroll database; a utility software resident in memory to permit a central site computer web server to receive from the remote site system payroll data stored in a database at the remote site; and a server to read payroll accounts either received from the web server or residing in a payroll database; an Internet connection has a browser appearing on a display. The central site may include a web server or alternatively a server having conditioning software to parse, filter and generally extract payroll data received from a system exclusive of other payroll deductions; and a rules engine customized to a particular remote payroll system, which may include a worker classification functionality to separate different occupations. Once the insurance premiums are determined, the premium amount due is transmitted through a network to a banking or billing system. The billing system debits an employer payables payroll account and credits an insurance company receivable account.

A database may be is interconnected to a payroll system for storing accumulated payroll information and other data pertinent to a payroll generation system. User input device(s) for receiving input into each terminal of the payroll system are also provided as well as output devices such as a printer or electronic document formatter for producing documents being interconnected and responsive to each of the payroll system. A banking system or billing system including an insureds bank may be accessed; a payables debit bank account may reside in the insureds bank, and may communicate with an insurance company bank wherein a receivables deposit account resides.

Figure 11:
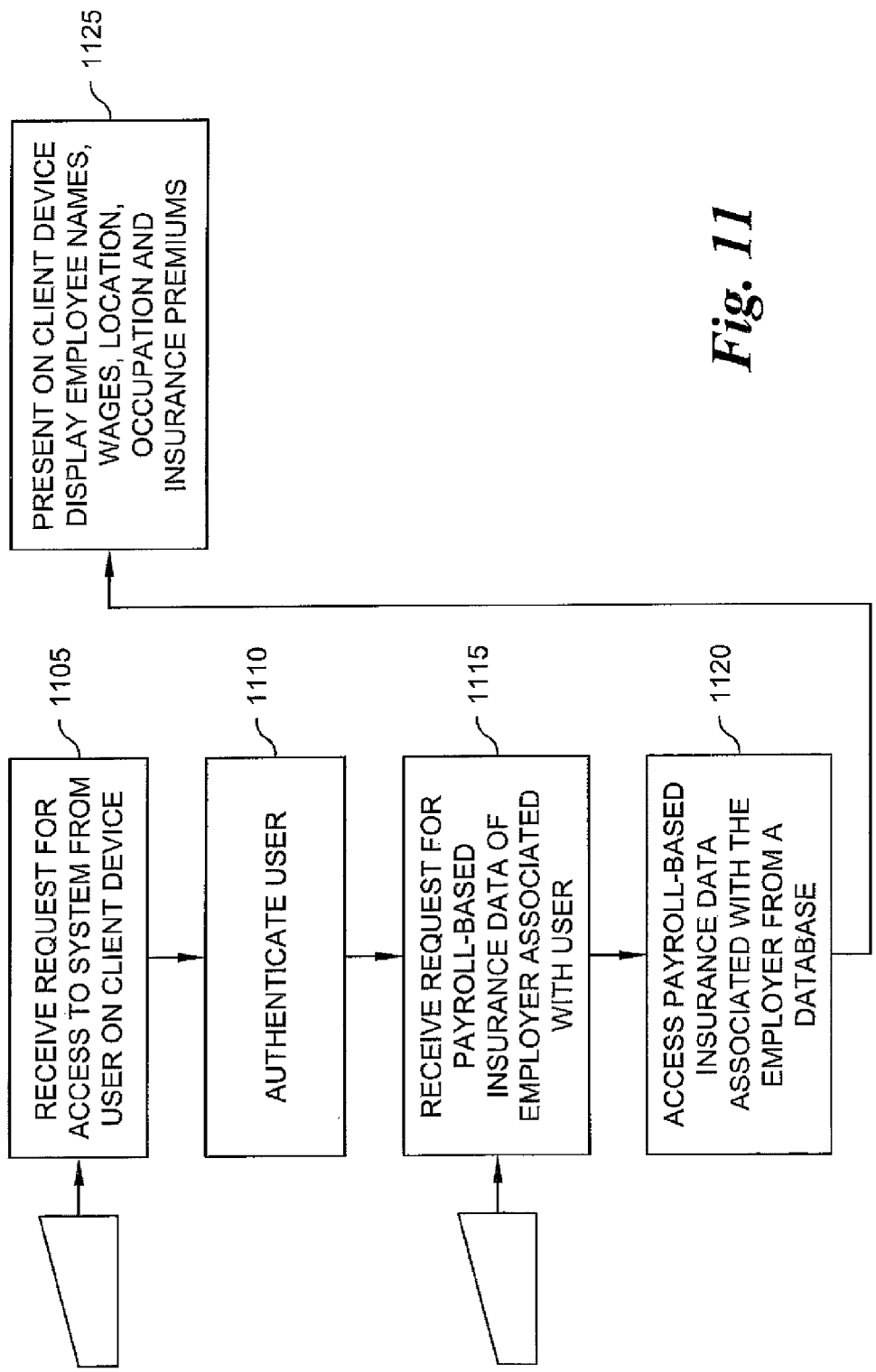
FIG. 11 is a process flow diagram of steps in a method of an embodiment of the invention.

Referring to FIG. 11, a process flow of a computer-implemented method for furnishing payroll-related insurance data to a user associated with an employer via a client device is illustrated. A request for access to a computer system is received 1105 from a user at a client device. The user is authenticated 1110, such as by a system authentication module. The system receives 1115 a user request for payroll-based insurance data of an employer associated with the user. Responsive to the request, the system accesses 1120, such as by a processor of a data access module, payroll-based insurance data of the employer from a database. The accessed payroll-based insurance data includes names of employees and employee data associated with each of the employees, the employee data including wages paid to the employee, occupation classification code of the employee, employment location of the employee, and cost of premium for payroll-based insurance coverage associated with the employee. The system presents 1125, such as by a processor of a presentation module, the accessed payroll based insurance data of the employer on a display of the client device. The data presented may include employee names and, associated with each of the employee names, employee data including wages paid to the employee, occupation classification code of the employee, employment location of the employee, and cost of premium for payroll-based insurance coverage associated with the employee.

Figure 12:
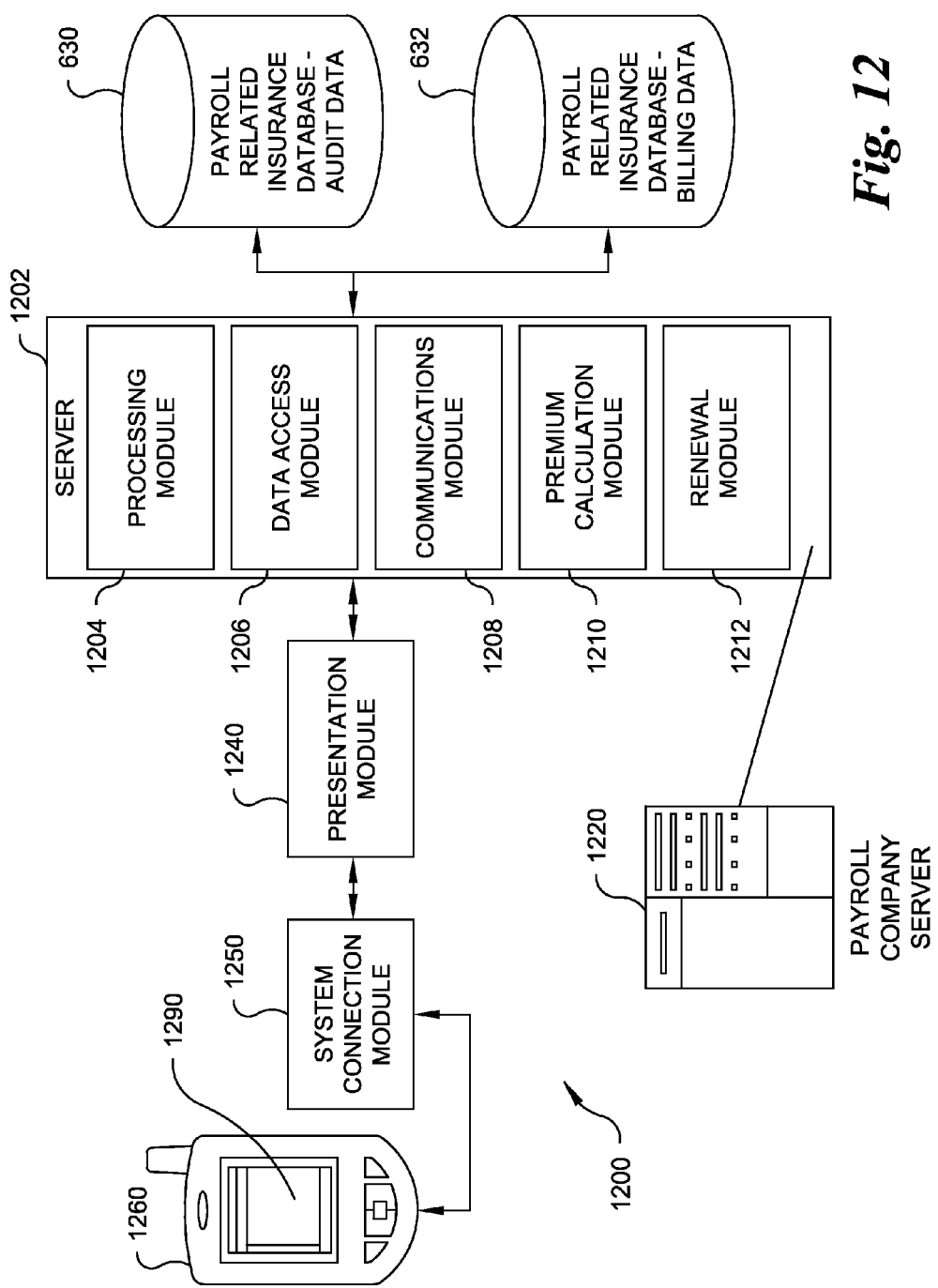
FIG. 12 is a schematic view of a system according to an embodiment of an invention.

Referring now to FIG. 12, a system 1200 for administration of payroll-related insurance transactions and policies, and particularly include a renewal module 1212, will be explained. Server 1202 has a processing module 1204, a data access module 1206, a communications module 1208, a premium calculation module 1210, and a renewal module 1212.

Data access module 1206 accesses employee data from a payroll data source, such as payroll company server 1220, and from exemplary insurance company databases 630, 632. A user associated with one or more employers may access server 1202 from client device 1260, which in this example is a smart phone. System connection module 1250 may authenticate the user and provide data security services for communications with client device 1260. The user is associated with an employer. Processing module 1204 performs processing functions, such as applying business rules to identify gaps or inconsistencies in payroll and insurance company data, and running business rules for verification of data furnished by the user from client device 1260. Presentation module 1240 presents data provided by processing module 1204 and data access module 1206 for display on client device 660. Presentation module 1240 may deliver, for example, a wage statement, listing wages paid to various employees on various payroll dates, or over time, in various categories. Renewal module 1212 may monitor when a policy is within a certain time period, such as 60 or 90 days, of the end of a term, and may then automatically generate a policy renewal. A policy renewal may be in the form of a policy endorsement renewing the party for another time period, such as a year. Renewal module 1212 may output a signal to a printing and mailing system for printing and mailing of policy renewals and related documents, such as endorsements.

Referring to FIG. 13, a high level view of an environment in which a system for administration of payroll-related insurance is shown. Payroll-related insurance processing system 1200 may perform functions of such a system as explained in the present application. System 1200 is within insurance company environment 1200. Claims processing system 1370 may generate requests, transmitted via LAN 1360, to payroll-related insurance processing system 1200. Claims processing system 1370 may process claims under payroll-related insurance policies. Such requests may be, for example, for verification of coverage and other details, such as policy exclusions and limits, as to a particular employee at a particular time, in connection with the policies. The request may be received by a processor of a communications module. A processor of a data access module may access, from a database, payroll-related insurance data. A processing module may compare data in the request with the data accessed from the database, and determine a response to the request for verification based on the comparing. A processor of a communications module may furnish the response to the request to the claims processing system 1370.

System 1200 may furnish data indicative of amounts to be invoiced, based on calculations of payroll-related insurance premiums, to invoicing system 1310. Data may identify the employer, payroll periods or other time periods, coverages, and premiums amounts. Invoicing system 1310 may format invoices as print files to printers 1312, which may interface with a mailing system to cause the invoices 1314 to be mailed, such as via a postal service, illustrated by post office 1330, to employer 1340. Employer 1340 may mail premium payments by check using post office 1330 to bank 1360 for crediting in an insurance company account. Alternatively, bank 1360 may be a bank of the employer, and a payment processing system 1320 may provide instructions to bank 1360 for debiting of the employer s mount. Upon receipt of payment by the insurance company, payment processing system provides data indicative of the payment to system 1200. The data indicative of the payment may be stored in insurance company databases. Employer 1340 may access system 1200 via Internet 1350 to view and update data as described in this application.

Referring to FIG. 14, a process flow of a computer-implemented method for classification of employees for use in payroll-based insurance services is shown. A system accesses 1405, such as by a processor of a data access module, employee data, of employees associated with an employer, from a payroll data source and from an insurance company database. The system identifies 1410, such as by a processor of a processing module, based on the accessed employee data, employees lacking an associated occupation classification code. The system presents 1415, such as by a processor of a presentation module, responsive to a request from a user associated with the employer, a fillable form on a display on a client device listing each of the identified employees and a user prompt for an occupation classification code. The system receives 1420 occupation classification codes from the user. The system furnishes 1425, such as by a processor of the processing module received occupation classification codes to the insurance company database.

Referring now to FIG. 15, a process flow of a computer-implemented method for receiving payroll related employee data and determining payroll related insurance premiums is shown. A fillable form is presented 1505, such as by a processor of a presentation module, for display on a client device. The form prompts the user to provide payroll data, the payroll data including employee geographic data, occupation classification and gross amount paid. Received data is provided 1510, such as by a processor of the presentation module received data to a processing module. Business rules are run 1515 by a processor of the processing module on the received data. The payroll data may then be furnished 1520 by the processor of the processing module to a premium calculation module. A processor of the premium calculation module may calculate 1525 insurance premiums based on the received payroll data.

References to state rules and regulations herein include rules and regulations of any jurisdiction that has separate workers compensation rules and regulations, including for example, within the jurisdiction of the United States: the District of Columbia, Puerto Rico, the U.S. Virgin Islands, other U.S. territories and possessions, the Navajo Nation and other American Indian nations.

Embodiments of the present invention are operable with computer storage products or computer readable media that contain program code for causing a processor to perform the various computer-implemented operations. The computer-readable medium is any data storage device that can store data which can thereafter be read by a computer system such as a microprocessor. The media and program code may be those specially designed and constructed for the purposes of the present invention, or they may be of the kind well known to those of ordinary skill in the computer software arts. Examples of computer-readable media include, but are not limited to magnetic media such as hard disks, floppy disks, and magnetic tape; optical media such as CD-ROM disks; magneto-optical media; and specially configured hardware devices such as application-specific integrated circuits (ASICs), programmable logic devices (PLDs), and ROM and RAM devices. Examples of program code include both machine code, as produced, for example, by a compiler, or files containing higher-level code that may be executed using an interpreter. Steps in the computer-implemented methods may be implemented in processors running software stored locally, and/or in configurations such as application service providers, in which certain steps are executed on processors communicating with one another over a network such as the Internet. Either stand-alone computers or client/server systems, or any combination thereof, may be employed.

A system in accordance with the invention may include means corresponding to each step in each method described herein. Each means may be implemented by a processor executing instructions contained in programs which may be stored in a storage medium, such as a magnetic or optical storage medium. The instructions may, when executed by a processor, cause the processor to execute algorithms disclosed in association with each step. It will be appreciated that any of the steps in the methods in accordance with the invention described herein may be so implemented.

An exemplary advantage of a system and method in accordance with an embodiment is that employers can obtain access to detailed payroll based insurance premium data with minimal printing and mailing costs. A further exemplary advantage is that the cost and delay associated with telephoning of employers by insurance company personnel to obtain classification information for employees for determination of payroll-based insurance premiums is avoided. A further exemplary advantage is that an employer that does not use a payroll service company may conveniently provide accurate payroll data to an insurance company for determination of premiums.

While the foregoing invention has been described with reference to the above embodiments, various modifications and changes can be made without departing from the spirit of the invention. Accordingly, all such modifications and changes are considered to be within the scope of the appended claims.

What is claimed is:

1. A computer system for administration of payroll-related insurance transactions, comprising:
a system access device configured to authenticate a user from a client device;
a data access device configured to, responsive to a request from the authenticated user via the client device, access from an insurance company database stored in a data storage device payroll-related insurance data of an employer associated with the authenticated user, said data including cost data at an employee level, occupation codes associated with employees and geographic location data associated with the employees;
a processing device configured to identify, based on the accessed employee data, employees lacking an associated occupation classification code, employees lacking an associated geographic location; and
a presentation device configured to furnish, for display on a client device: insurance cost data at an employee level; an occupation code form listing each of the employees identified as lacking an associated occupation classification code and a user prompt for an occupation classification code, and for receiving classification codes from the user; and a fillable form prompting the user to provide payroll data, the payroll data including employee geographic data, occupation classification, gross amount paid and data relating to an officer and owner status associated with one or more of the employees; to receive classification codes and payroll data from the client device, and to furnish received classification codes and payroll data to the processing device;
wherein the processing device is further for furnishing received payroll data and classification codes to the insurance company database.

2. The computer system of claim 1, wherein the payroll-based insurance data comprises workers compensation insurance data.

3. The computer system of claim 1, wherein the payroll data further comprises data relating to vacation wages and sick time wages.

4. The computer system of claim 1, wherein the presentation device is further configured to prompt a user to select a payroll date, and to present payroll data for the selected payroll date responsive to user selection of the payroll date.

5. The computer system of claim 1, wherein the presentation device is further configured to receive modifications to the payroll data from the user, and to furnish the modifications to the processing device; and
wherein the processing device is configured to apply business rules to the modifications, and, dependent on a result of the application of the business rules, furnish the modifications to the insurance company database, or generate an output to the presentation device to notify the user that the modifications are not implemented.

6. The computer system of claim 5, wherein the application of the business rules comprises determining whether combinations of state and occupation code are covered by an insurance policy issued to the employer by the insurance company.

7. A computer system for classification of employees for use in payroll-based insurance services, comprising:
a data access device configured to access employee data from a payroll data source and from an insurance company database stored in a data storage device, the employee data including name, state, and wage amounts;
a processing device configured to identify, based on the accessed employee data, employees lacking an associated occupation classification code and employees lacking associated geographic location data; and
a presentation device configured to present a fillable form on a display on a client device listing each of the identified employees, a user prompt for an occupation classification code, a user prompt for geographic location information and one or more user prompts for employee status as owner or officer, and to receive classification codes, geographic location information and employee status information from the user;
the processing device being further for furnishing received classification codes, geographic location data and employee status data to the insurance company database; and
a premium determination engine for calculating premiums based on the received classification codes, geographic location data and employee status data.

8. The computer system of claim 7, wherein the payroll data source is a third party payroll service provider.

9. The computer system of claim 7, wherein the payroll data source is an employer system based file.

10. The computer system of claim 7, wherein the processing device is further for accessing and applying business rules to determine premiums applicable to an employee having an officer or owner status.

11. The computer system of claim 10, wherein the business rules comprise minimum and maximum premiums independent of wages for each employee having an officer or owner status.

12. The computer system of claim 7, further comprising a firewall unit, wherein data passes from the client device to the presentation device via the firewall unit.

13. The computer system of claim 7, wherein the processing device is further configured to determine permitted occupation codes for an employer associated with the user, and wherein the presentation device is further configured to provide a drop down menu of the permitted occupation codes.

14. The computer system of claim 7, wherein the processing device is further configured to apply business rules to the received classification codes, and wherein the presentation device is further for providing an error message for display on the user device responsive to a processing device detection of a violation of one of the business rules.

15. A computer-implemented method for classification of employees for use in payroll-based insurance services, comprising:

accessing by a processor of a data access module employee data, of employees associated with an employer, from a payroll data source and from an insurance company database stored in a data storage device;

identifying by a processor of a processing module, based on the accessed employee data, employees lacking an associated occupation classification code and employees lacking an associated geographic location;

presenting, by a processor of a presentation module, responsive to a request from a user associated with the employer, a fillable form on a display on a client device listing: each of the identified employees lacking an associated occupation classification code and a user prompt for an occupation classification code; each of the identified employees lacking an associated geographic location and a user prompt for geographic location information; and one or more user prompts for employee status as owner or officer;

receiving data indicative of occupation classification codes, geographic location information and employee status and owner or officer from the client device; and furnishing by a processor of the processing module received occupation classification codes, received geographic location information and received employee status information to the insurance company database.

16. The computer-implemented method of claim 15, wherein the payroll data source is a third party payroll service provider.

17. The computer-implemented method of claim 15, wherein the payroll data source is an employer system based file.

18. The computer-implemented method of claim 15, further comprising determining by the processor of the processing module, based on employer data, selected occupation codes, and providing by the processor of the presentation module a drop down menu of the selected occupation codes.

19. The computer-implemented method of claim 15, further comprising applying by the processor of the processing module business rules to the received classification codes, and providing by the presentation module an error message for display on the client device responsive to detection by the processor of the process module detection of a violation of one of the business rules.

\* \* \* \* \*